United States Patent
Balasubramaniam et al.

(10) Patent No.: US 11,022,502 B2
(45) Date of Patent: *Jun. 1, 2021

(54) ULTRASONIC WAVEGUIDE TECHNIQUE FOR DISTRIBUTE SENSING AND MEASUREMENTS OF PHYSICAL AND CHEMICAL PROPERTIES OF SURROUNDING MEDIA

(71) Applicant: Indian Institute of Technology Madras, Chennai (IN)

(72) Inventors: Krishnan Balasubramaniam, Chennai (IN); Suresh Periyannan, Chennai (IN)

(73) Assignee: INDIAN INSTITUTE OF TECHNOLOGY MADRAS

( * ) Notice: Subject to any disclaimer, the term of this patent is extended or adjusted under 35 U.S.C. 154(b) by 0 days.

This patent is subject to a terminal disclaimer.

(21) Appl. No.: 16/726,123

(22) Filed: Dec. 23, 2019

(65) Prior Publication Data

US 2020/0217726 A1 Jul. 9, 2020

Related U.S. Application Data

(63) Continuation of application No. 15/561,823, filed as application No. PCT/IN2016/000081 on Mar. 29, 2016, now Pat. No. 10,520,370.

(30) Foreign Application Priority Data

Apr. 10, 2015 (IN) ............................ 1887/CHE/2015

(51) Int. Cl.
*G01K 11/24* (2006.01)
*G01K 11/32* (2021.01)
(Continued)

(52) U.S. Cl.
CPC ................ *G01K 11/24* (2013.01); *G01K 3/14* (2013.01); *G01K 11/22* (2013.01); *G01K 11/32* (2013.01)

(58) Field of Classification Search
CPC .......... G01K 11/24; G01K 3/14; G01K 11/22; G01K 11/32
See application file for complete search history.

(56) References Cited

U.S. PATENT DOCUMENTS 6,047,602 A * 4/2000 Lynnworth ............. G01F 1/662
  73/632
6,137,117 A * 10/2000 Feldstein ........... G01N 21/6428
  250/461.2
(Continued)

FOREIGN PATENT DOCUMENTS

| CN | 100490561 C | 5/2009 |
| EP | 0465029 A2 | 1/1992 |
| WO | 2004090484 A2 | 10/2004 |

OTHER PUBLICATIONS

International Search Report and Written Opinion, as issued in connection with International PCT/IN2016/000081, dated Aug. 3, 2016, 7 pgs.

(Continued)

*Primary Examiner* — Nathaniel T Woodward
*Assistant Examiner* — Philip L Cotey
(74) *Attorney, Agent, or Firm* — Maschoff Brennan; Jonathan M. Benns

(57) ABSTRACT

This invention relates to a waveguide with distributed sensors that support traveling ultrasonic wave modes to provide quantitative local distributed sensing of the physical and chemical properties of the medium surrounding the sensor locations and/or the material properties of the waveguide. The plurality of sensors is operably associated with a plurality of wave modes for probing and identifying a (Continued)

plurality of properties simultaneously. The reflected waves are representative of local information about the surrounding media at that sensor location.

20 Claims, 8 Drawing Sheets

(51) Int. Cl.
  *G01K 11/22* (2006.01)
  *G01K 3/14* (2006.01)

(56) References Cited

U.S. PATENT DOCUMENTS

| | | | | |
|---|---|---|---|---|
| 6,259,089 B1* | 7/2001 | Vali | ............... | G01C 19/722 250/227.19 |
| 6,343,511 B1* | 2/2002 | Lynnworth | ............... | G01F 1/662 73/644 |
| 6,359,367 B1* | 3/2002 | Sumanaweera | ............... | B06B 1/0292 310/306 |
| 6,503,204 B1* | 1/2003 | Sumanaweera | ............... | B06B 1/0622 600/459 |
| 8,319,494 B2* | 11/2012 | Simek | ............... | G01N 27/83 324/220 |
| 8,474,333 B2* | 7/2013 | Berendes | ............... | G01L 5/0085 73/862.55 |
| 8,649,242 B2* | 2/2014 | Martin | ............... | G10K 11/32 367/87 |
| 10,520,370 B2* | 12/2019 | Balasubramaniam | ............... | G01K 11/32 |
| 2005/0232532 A1* | 10/2005 | Wang | ............... | A61B 5/6892 385/13 |
| 2007/0123776 A1* | 5/2007 | Aharoni | ............... | G10K 15/046 600/437 |
| 2008/0107150 A1* | 5/2008 | Brummel | ............... | G01K 7/42 374/119 |
| 2012/0152024 A1* | 6/2012 | Johansen | ............... | G01F 1/7086 73/655 |
| 2012/0285260 A1* | 11/2012 | Mueller | ............... | G01F 1/662 73/861.27 |
| 2013/0081447 A1* | 4/2013 | Carter | ............... | G02B 6/10 73/30.01 |
| 2015/0176399 A1* | 6/2015 | Scarton | ............... | E21B 41/0085 367/82 |
| 2015/0260612 A1* | 9/2015 | DeSilva | ............... | G01K 11/24 702/48 |

OTHER PUBLICATIONS

Goss, S.A. et al. "Sparse random untrasound phased array for focal surgery". IEEE Transactions on Ultrasoncics, Ferroelectrics, and Frequency Control, vol. 43, Issue 6, Nov. 1996.

* cited by examiner

ULTRASONIC WAVEGUIDE TECHNIQUE FOR DISTRIBUTE SENSING AND MEASUREMENTS OF PHYSICAL AND CHEMICAL PROPERTIES OF SURROUNDING MEDIA

This patent application is a continuation of U.S. patent application Ser. No. 15/561,823 filed Sep. 26, 2017 now U.S. Pat. No. 10,520,370, which is a section 371 nationalization of PCT Application No. PCT/IN2016/000081 filed Mar. 29, 2016, which claims priority to Indian Patent Application No. 1887/CHE/2015 filed Oct. 4, 2015, which applications are incorporated herein by specific reference in their entirety.

FIELD OF INVENTION

This technology comes in the area of sensors and sensing techniques for physical and chemical measurements in multiple regions with a certain volume/area.

PRIOR ART

Some of the prior arts are:
1. Application Publication No: US 2007/0123776 A1 ULTRASONIC PROBING DEVICE WITH DISTRIBUTED SENSING ELEMENTS
2. Application Publication No: US 2012/0152024 A1 DISTRIBUTED ACOUSTIC SENSING (DAS)-BASED FLOWMETER
3. Application Publication No. US 2013/0081447 A1 SUBSTRATE-INTEGRATED HOLLOW WAVEGUIDE SENSORS
4. U.S. Pat. No. 6,259,089 B1 INTEGRATED OPTICS ROTATION SENSOR
5. Application No. CN 03103181 (Publication no. CN100490561 C) Spiral acoustical wave-guide type electro acoustical inverting system
6. U.S. Pat. No. 8,474,333 B2 INDUSTRIAL ROLL WITH OPTICAL ROLL COVER SENSOR SYSTEM
7. U.S. Pat. No. 6,137,117 A INTEGRATING MULTI-WAVEGUIDE SENSOR
8. U.S. Pat. No. 6,359,367 B1 MICROMACHINED ULTRASONIC SPIRAL ARRAYS FOR MEDICAL DIAGNOSTIC IMAGING
9. U.S. Pat. No. 6,503,204 B1 TWO-DIMENSIONAL ULTRASONIC TRANSDUCER ARRAY HAVING TRANSDUCER ELEMENTS IN A NON-RECTANGULAR OR HEXAGONAL GRID FOR MEDICAL DIAGNOSTIC ULTRASONIC IMAGING AND ULTRASOUND IMAGING SYSTEM USING SAME
10. U.S. Pat. No. 8,319,494 B1 PIPELINE INSPECTION TOOL WITH DOUBLE SPIRAL EMAT SENSOR ARRAY
11. U.S. Pat. No. 8,649,242 B2 INSONIFICATION DEVICE THAT INCLUDES A THREE-DIMENSIONAL NETWORK OF EMITTERS ARRANGED IN AT LEAST TWO CONCENTRIC SPIRALS, WHICH ARE DESIGNED TO GENERATE A BEAM OF HIGH-INTENSITY FOCUSED WAVES
12. Publication: IEEE TRANSACTIONS ON ULTRASONICS, FERROELECTRICS, AND FREQUENCY CONTROL, VOL 43, NO. 6, NOVEMBER 1996 SPARSE RANDOM ULTRASOUND PHASED ARRAY FOR FOCAL SURGERY All of the prior art only relate in the optical domain or in optical/acoustical combination domain. None of these exploited using the ultrasonic based waveguides. Further known prior art deal using single sensors in a waveguide but none have disclosed ultrasonic waveguide based distributed sensing system/technique.

SUMMARY OF THE INVENTION

The invention described here is based on a waveguide with distributed sensors that support travelling ultrasonic wave modes to provide quantitative local distributed sensing of the physical and chemical properties of the medium surrounding the sensor locations and/or the material properties of the waveguide. The ultrasonic wave is generated on one end of the waveguide using a transducer. The reflected wave is captured using a transducer that is co-located with the generator. The transmitted wave is captured using a transducer located at the far end. The captured wave is converted into electrical signal and interpreted to provide individual local information about the surrounding media in the vicinity of the sensors. The signatures of the electrical signal such as amplitudes, time of flight, frequency, etc. is utilized to derive the quantitative measurements at each sensor location along the waveguide. The waveguide, with multiple sensors located along the length of the waveguide, is configured in 1 D, 2D, or 3D shapes to provide distributed measurements in a given volume.

This novel ultrasonic technique for the distributed temperature measurements uses a-single robust wire or strip-like waveguides, shaped in the form of 1 D, 2D or 3D (Linear, Helical, Spiral, etc.) configuration, and can cover large area/volume in enclosed regions. Such distributed sensing has low cost applications in the long term monitoring critical enclosures such as containment vessels, flue gas stacks, furnaces, underground storage tanks, buildings for fire, etc. For instance, this can be used over a wider range of ambient temperatures, may be from very low (−100° C.) to very high (2000° C.). In one form of embodiment, the transduction is performed using Piezo-electric crystals that are bonded to one end of the waveguide which both transmitter as well as receivers. The wires will have periodic or a periodic reflector embodiments (bends, gratings, etc.) that allow reflections of an input ultrasonic wave, in a pulse echo mode, back to the crystal. Using the time-of-flight (TOF) variations at the multiple predefined reflector locations, the temperature are mapped using 3D volume software. Using either the L(0,1) or the T(0,1) guided waves, either separately or simultaneously, measurements other than temperature may also be performed.

The technique uses guided ultrasonic wave modes that are generated using an ultrasonic transducer at one end of the wave guide, travel along the length of the waveguide, interacts with the end of the waveguides, and is reflected back to from this end. The end of the waveguides have unique embodiments that permit a multiple interactions between the ultrasonic wave and the embodiment. The reflected signal from are detected and recorded using an ultrasonic transducer and associated instrumentation. The necessary ultrasonic amplitudes and time of flights are obtained from the reflected signal and the properties of the waveguide material and the surrounding fluid is calculated.

Some of the typical configuration of the end of the waveguide are shown in FIGS. 1 & 2. Also, some typical sensors embodiments are shown in FIG. 3.

A typical instrumentation for the data collection is shown in the FIG. 4. However, microprocessor and FPGA based hardware can be used to replace many of the instrumentation functionalities.

One of the typical modes of excitation of the guided wave modes in the waveguide is through using a Piezoelectric Crystal based transduction. The excitation of the desired wave modes will depend on the relative position of the crystal, the orientation of the piezoelectric domain coordinates (which influences the surface tractions provided by the transduction). The generation of several guided wave modes is feasible including T(0,1), L(0,1), L(0,2), F(1,1), etc. all of which can be used in the sensing. While, piezo-electric method is a typical method of generation, other modes such as electromagnetic, laser based, thermo-electric, etc. are also equality applicable. The figure below shows some typical positioning of the piezo-electric based transducers on the waveguide. The vibration of the piezo crystal is shown in FIG. 5.

Supporting Data

Illustrative experiments have been conducted for the measurement of temperature and temperature gradients using one embodiment of such a distributed sensor made of a wire/rod made of a high temperature material. The time of flight of the signal of the ultrasonic guided wave that travels along the length of the waveguide, reflects due to the sensor features and from the end of the waveguide and returns back to the transducer was employed in the sensing. The sensor was placed inside a furnace and thermocouples were used for verification of temperature measurement purposes. The helical waveguide has the flexibility to vary the longitudinal spacing between the notches and hence the longitudinal resolution of the measurements can be varied. A typical RF signal obtained from the helical waveguide with notch embodiment sensors is shown in FIG. 7. The reflections from the notches are observed.

Using a variable length fixture, the overall length of the waveguide, could be increased or decreased to provide the flexibility in the longitudinal spatial resolution of the measurements. The waveguide was then introduced into a high temperature furnace and 2 separate experiments were conducted. The first experiment involved-keeping the entire spiral/helical/circular part of the waveguide in the uniform temperature region of the waveguide. In the second experiment, the helical waveguide was kept in a region where there was a temperature gradient. The results from the uniform region experiment is shown in FIG. 8 where it can be observed that as the temperature of the furnace was increased, all of the waveguide regions (gage lengths) provided the same temperature readouts.

The same sensor (helical) was then introduced inside the insulated region of the furnace, where the bottom of the sensor is at the highest temperature and the top of the sensor was at the lowest temperature. The results are described in FIG. 9, where it can be seen that the comparison between the ultrasonic distributed sensing using a single waveguide is validated well with the set of many standard K type thermocouples.

Multiple waveguides made up of different or same material can be used for distributed sensing using either a single or multiple transducer(s). A typical multi-waveguide sensor system using a single ultrasonic transducer is shown in FIG. 10.

THE ADVANTAGES AND UNIQUENESS OF THE INVENTION ARE

Figure 1:
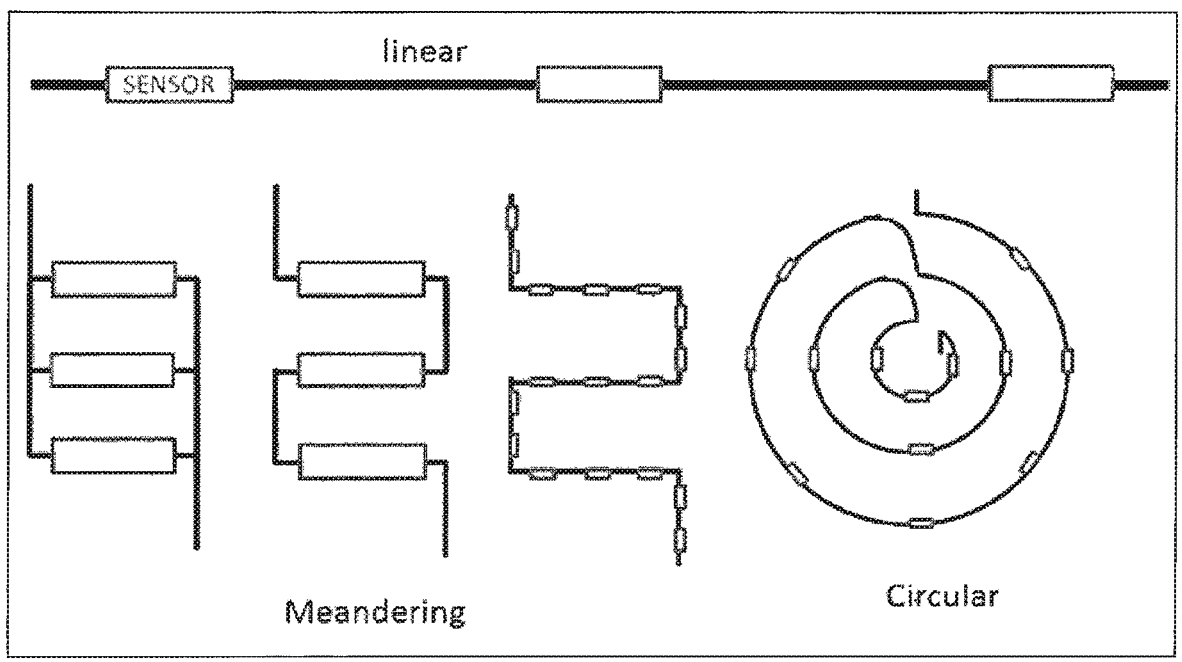
FIG. 1: Typical (some) 2 Dimensional Distributed sensing configurations on an ultrasonic waveguide showing the sensor locations (boxes) and the waveguide (line).
Figure 2:
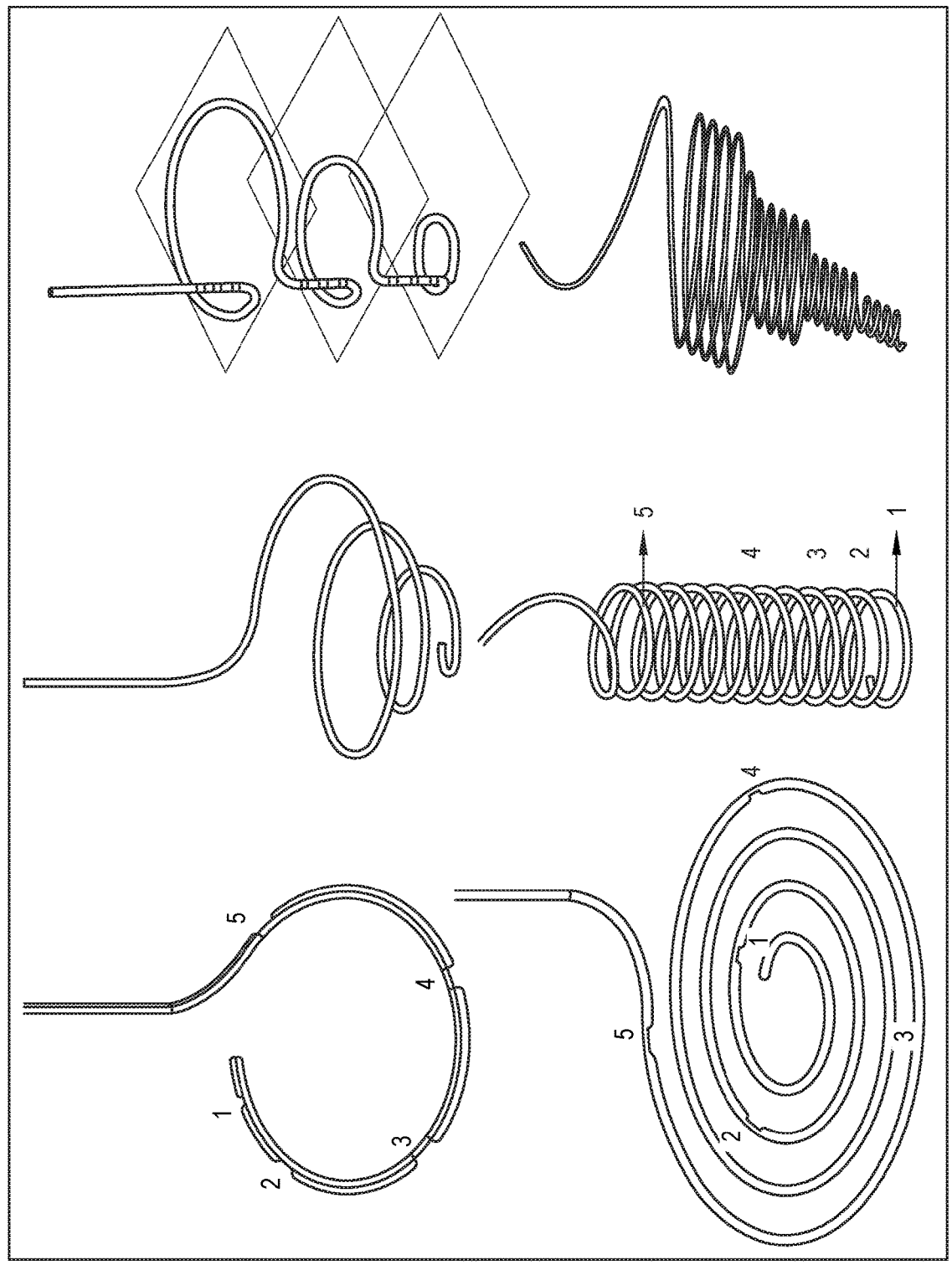
FIG. 2: Typical (some) 3 Dimensional Distributed sensing configurations on an ultrasonic waveguide showing the sensor locations (boxes) and the waveguide (line).
Figure 3:
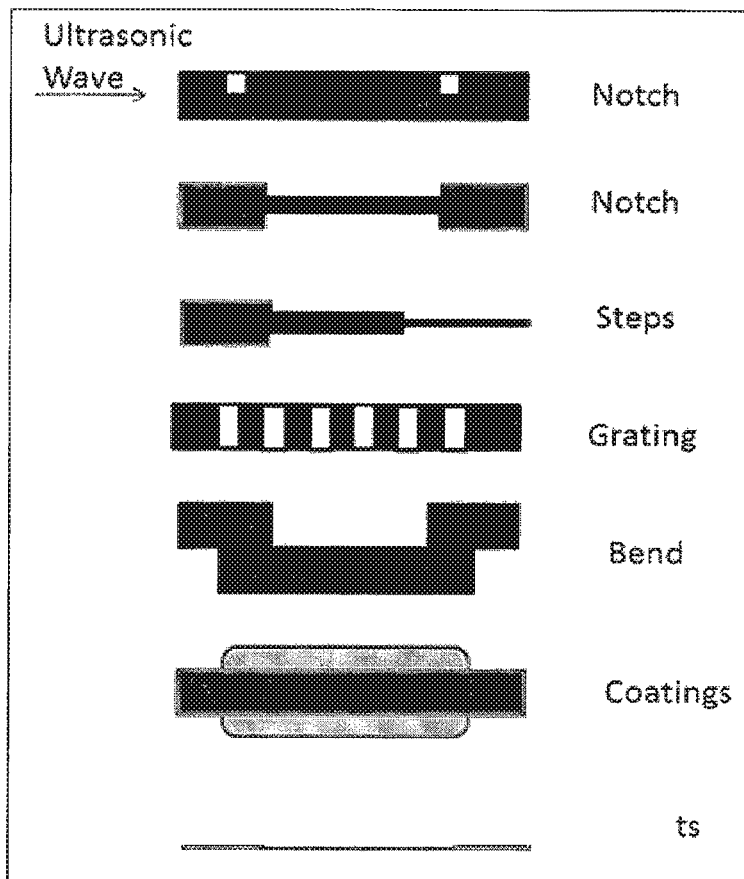
FIG. 3: Typical sensors that can be embodiments on an ultrasonic waveguide in order to provided reflected/transmitted signal signatures. The signature changes are used for sensing the physical and chemical properties of the surrounding media. The use of special coatings that changes its mechanical properties due to exposure to target chemical or physical properties may be combined with other embodiments.
Figure 4:
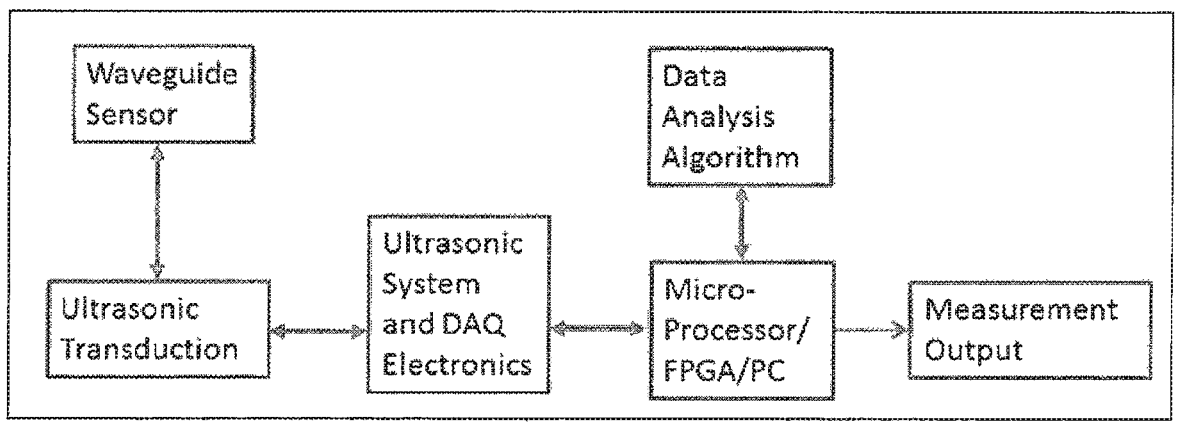
FIG. 4: Typical instrumentation block diagram for the sensor data collection.
Figure 5:
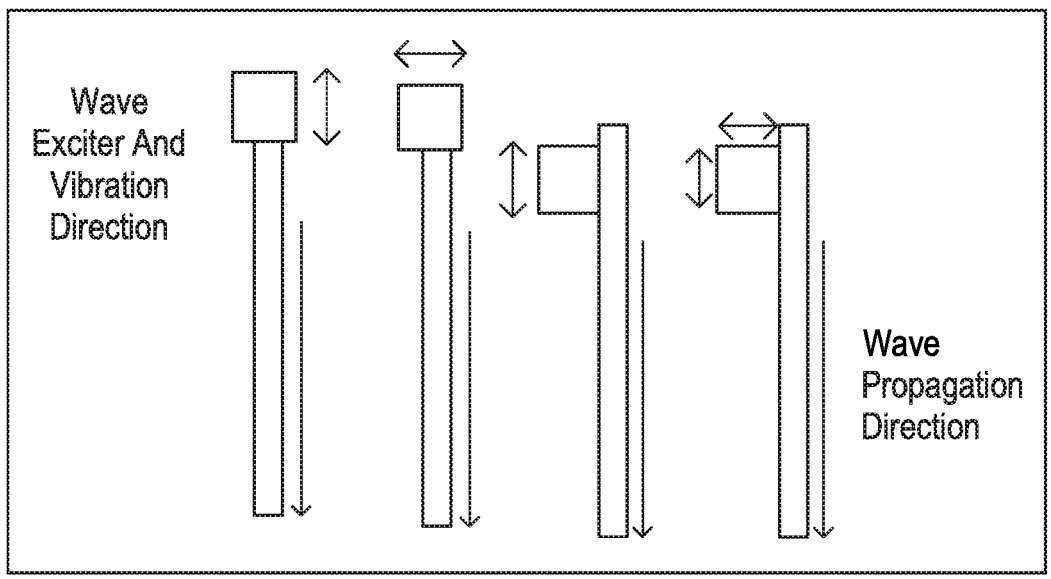
FIG. 5: Schematic of some typical wave generation mechanisms using Piezoelectric exciter showing the excitation vibration direction and the wave propagation directions.
Figure 6A:
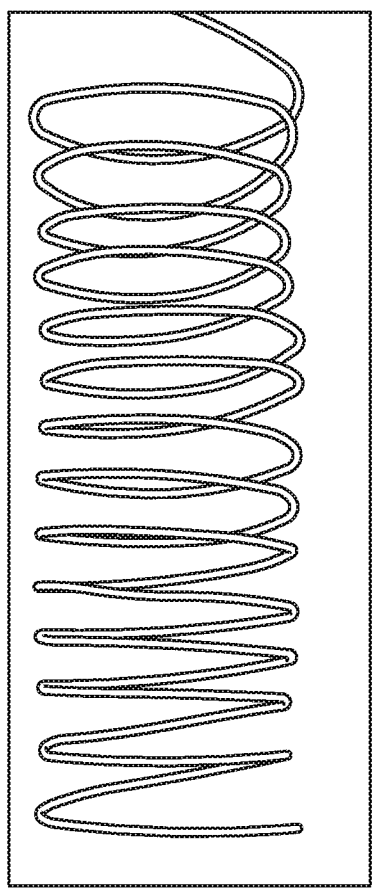
FIGS. 6A and 6B: A typical distributed sensor in helical format (FIG. 6A) schematic, (FIG. 6B) as fabricated using metal wire, with 18 notches as reflector embodiment to provide local ultrasonic signatures. This spiral or helical format allows for flexibility in depth/length resolution of the measurements.
Figure 6B:
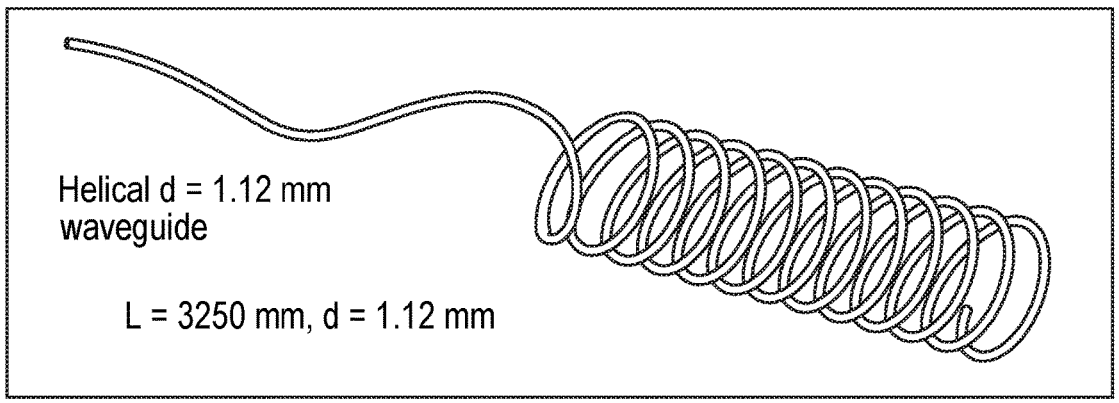
Figure 7:
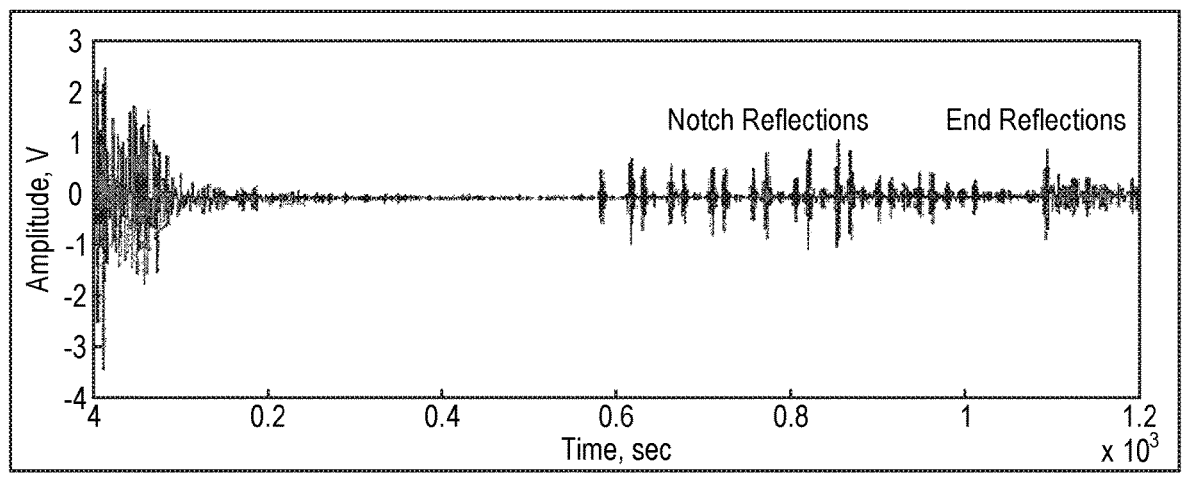
FIG. 7: A typical ultrasonic reflected signal signature from the 18 notch spiral or helical waveguide showing the notch reflections and the reflection from the end of the waveguide. The notches here were machined in pairs so that first notch in any pair serves as a reference and difference in the signatures between the first and the second notch is used for measurement.
Figure 8:
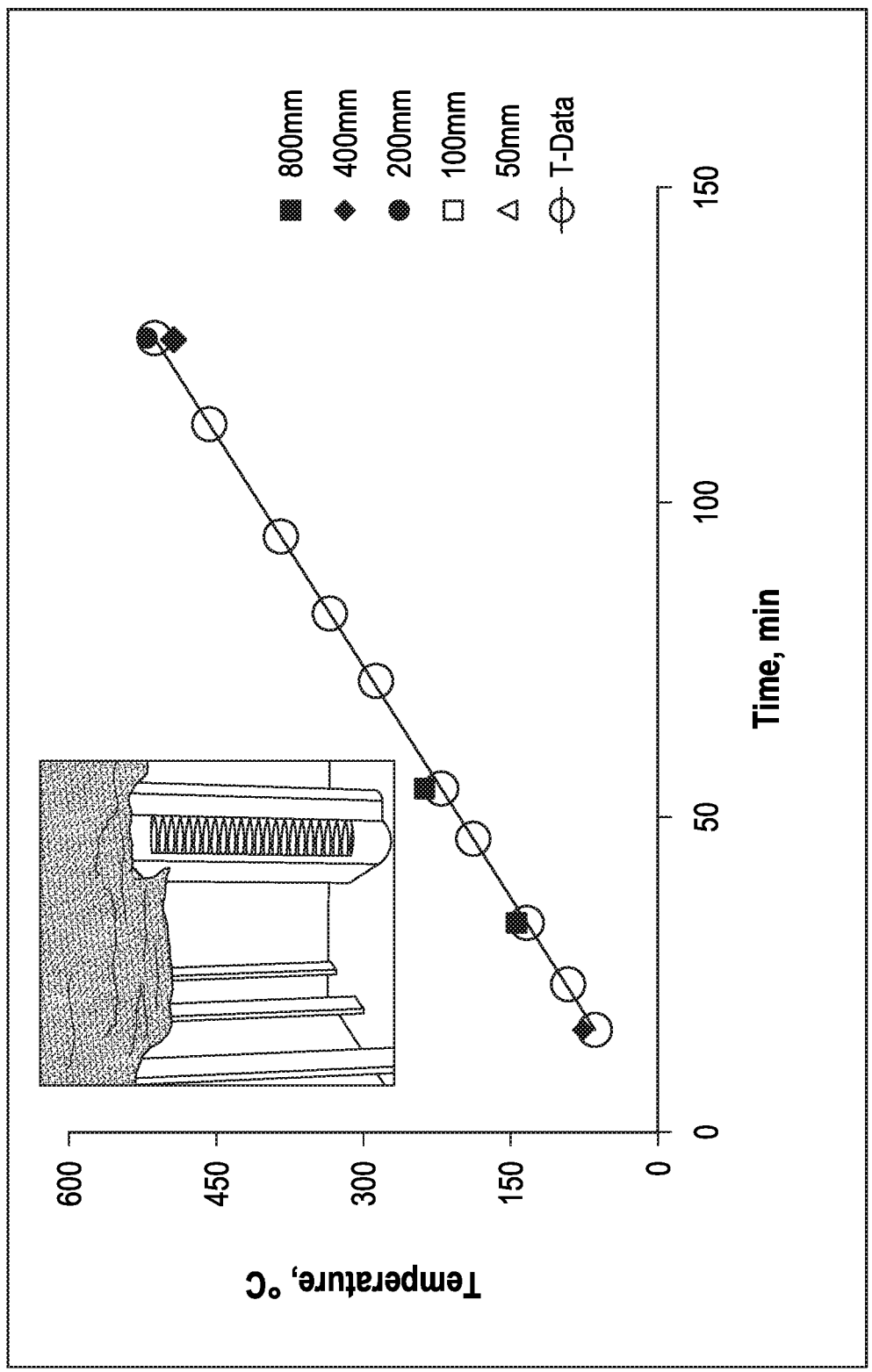
FIG. 8: The 18 notches helical waveguides experiment results in a uniform region of the furnace, during the heating cycle, with insert of the photo of the sensor inside the uniform region of the furnace. It can be observed that at each time of acquisition of the data, all regions are showing the same temperature. A set of standard thermocouples were used (T-Data) to validate the measurements.
Figure 9:
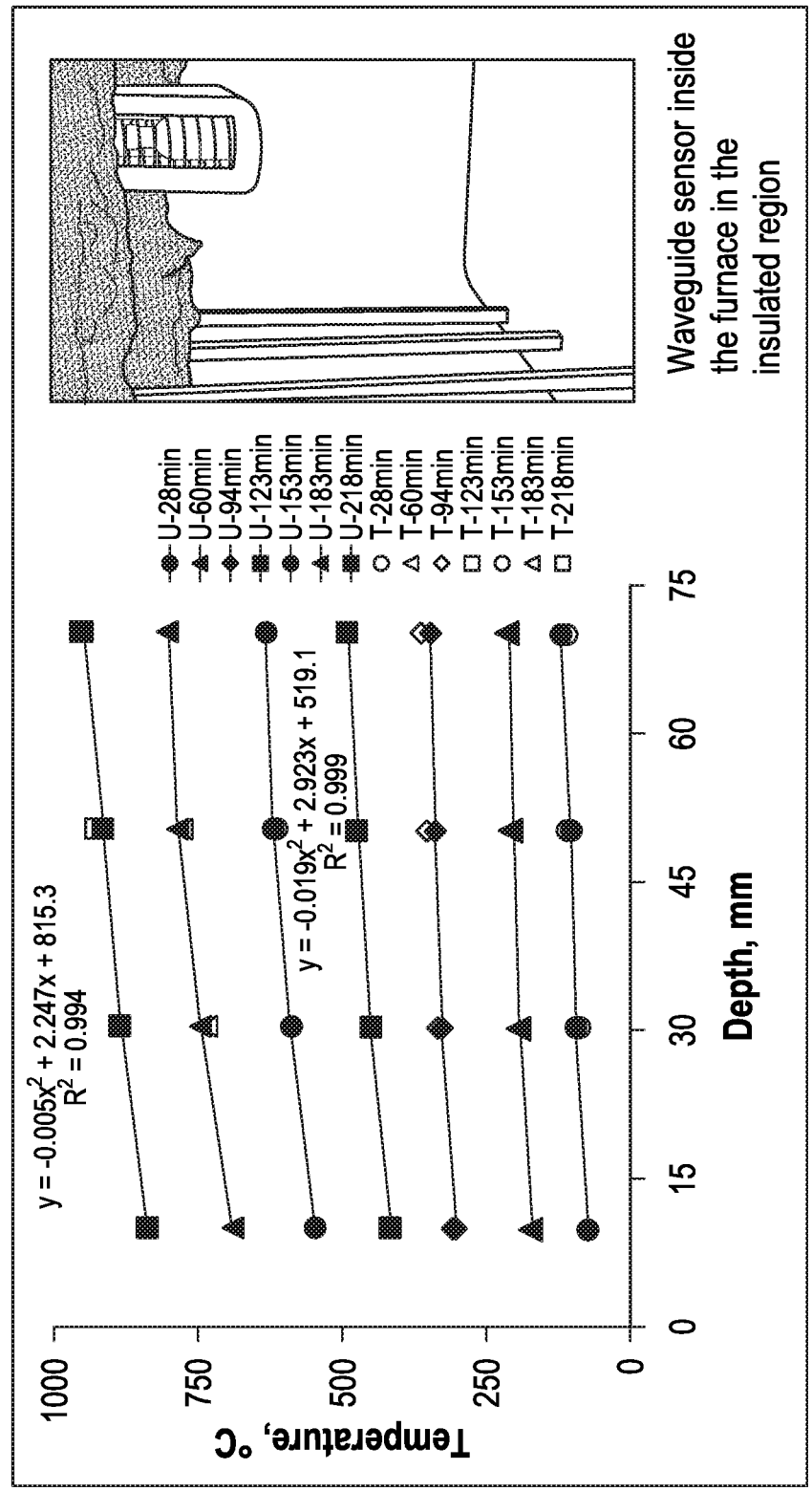
FIG. 9: The validation of the single ultrasonic waveguide distributed sensor in a temperature gradient zone of the furnace (insert) showing that the ultrasonic sensors measurements (U) at different depths are comparable to the standard thermocouple measurements (T) at different time instances of acquisition of data during the heating cycle.
Figure 10:
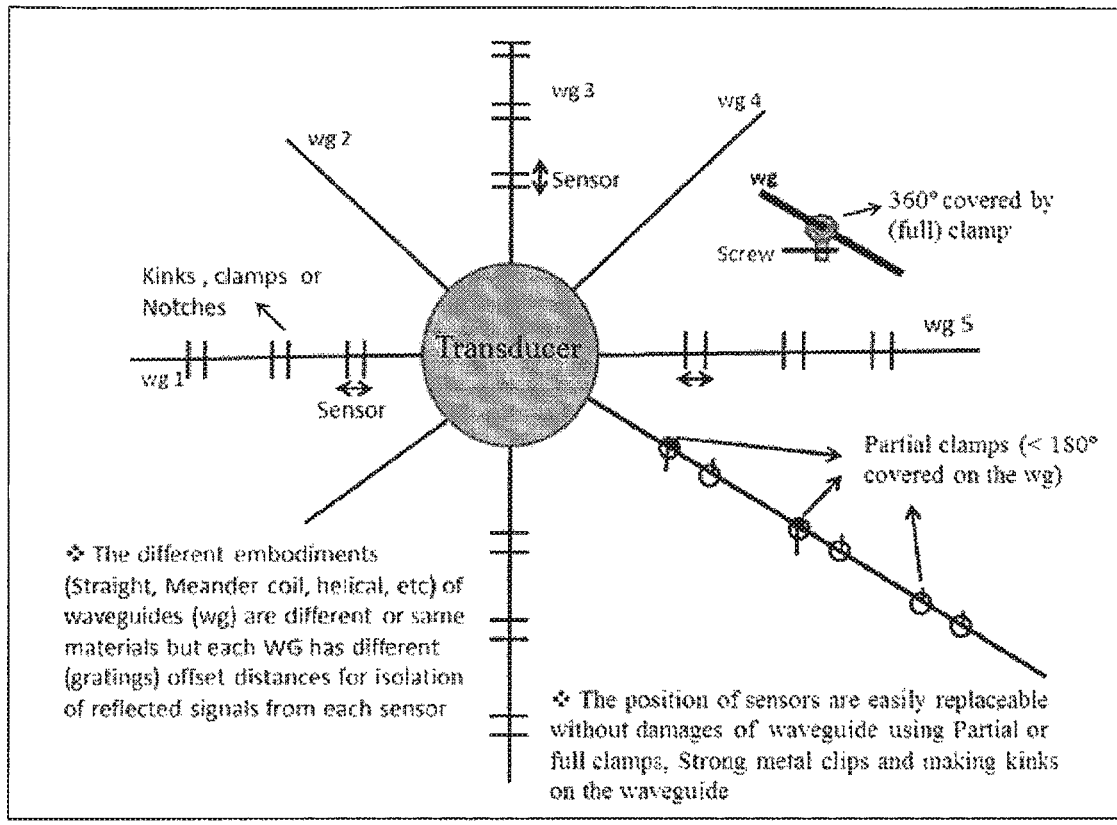
FIG. 10: The schematic representation of multiple waveguides with sensors connected to a single ultrasonic transducer.

Using multiple sensor embodiments on a single waveguide, with the ultrasonic wave interacts with the sensor embodiments to provide a reflected or a transmitted wave, whose signature is assessed to provide local information measurements about the surrounding media in the vicinity of the sensor embodiments.

The wave modes that are generated and received may be of the Longitudinal, Flexural or Torsional modes including, but not limited to, Longitudinal (L(m,n)), Torsional (T(m,n), Flexural (F(m,n)), Anti-Symmetric (A(m)), Symmetric (S(m)), Shear Horizontal (SH(m)), etc. The wave modes used can be mode converted wave modes generated from the sensor embodiments.

The waveguide has configurations, such as linear, meandering, circular, spiral, etc. with the configuration optimized for the type of measurement to be made.

The waveguide configuration and the sensor locations can be in 1 D, 2D or 3D domain.

The waveguide configuration and the sensor locations can be designed to make measurements in a confined volume or over a very large volume through appropriate shape of the waveguide and spacings between the sensor embodiments.

The waveguides may have difference cross-sections including rectangular, circular, cylindrical, elliptical, triangular, diamond, hexagonal, etc. The wave guide may be in the form of a solid rod; wire, plate, sheet, etc., or hollow tube, pipe, shell, etc.

Sensor embodiments may include different forms that provide a local acoustic impedance change. Such embodiments may include notches, dimension changes, bends, Bragg gratings, joints (such as welds), treatments, coatings, etc.

The ultrasonic waveguide gratings could be variable based on the resolution of the (level of fluid and temperature, etc.) measurements due to the radial or axial and or both dimensions.

The sensor embodiments are distributed along the waveguide at distances/spacings that can either be uniform or arbitrary.

The sensor embodiments allow for the partial reflection of the traveling ultrasonic waves at the sensor embodiment locations. This reflected wave and consequently the transmitted wave contains information regarding the local information around the sensor locations.

The reflected and/or transmitted waves are converted into electrical signals and the signature of these signals are analyzed to provide the local information about the surrounding media at each sensor locations.

The local information measurements of the surrounding media that can be measured may include physical properties such as temperature, pressure, viscosity, density, humidity, flow, level, strain, stress, moduli, coefficient of thermal expansion, ultraviolet radiation, magnetic and electric fields, etc., and chemical properties such as chemical composition, concentrations, reactions, cross-linking, etc.

Multiple properties can be simultaneously measured using the same sensor embodiment by using different ultrasonic measurements viz. amplitude, time of flight, frequency, etc.

Multiple properties can be simultaneously measured using the same sensor embodiment by probing using different ultrasonic wave modes.

Multiple properties can be simultaneously measured using the same waveguide Using a combination of the sensor embodiments.

The generation and reception of the waves can be from either one end or generation from one end and reception at the other end or any location on the waveguide.

Generation and Reception of the ultrasonic wave modes may be through appropriate means including piezo-electric, electromagnetic, magnetostrictive, thermo-elastic, opto-mechanical, or electro-mechanical methodologies.

More than one of the wave modes can be generated and received simultaneously to provide multiple signals for measurement.

The analysis can be in time domain, frequency domain, or time-frequency domain.

The waveguide can be made of different materials such as metals, glass, ceramics, polymers, etc.

The distributed sensing can be made from very low temperatures (−100 Celsius) to elevated temperatures (2000 Celsius) by choosing the appropriate material for the waveguide and appropriate sensor embodiment.

The sensor will measure the properties of the inviscid and viscous fluids/Solids/Slurry/etc. in contact with the outside surface or the inside surface of waveguide including viscosity, temperature, or density.

The sensor, when used in multiple numbers, will measure the gradients/profiles of the properties along the length of the waveguide.

The waveguides, when used in multiple numbers, can be connected to a single or plural number of transducers to provide customized monitoring.

The specification includes few embodiments but only for the purpose of understanding. The scope of the invention is not limited by disclosed by these embodiments. All variations and modifications as will be obvious to skilled person is well within the scope and spirit of the invention.

The invention claimed is:

1. A method for distributed sensing and measurements of physical and chemical properties of surrounding media, the method comprising:
generating at least one ultrasonic wave having a wave mode;
providing the at least one ultrasonic wave to a plurality of waveguides, each waveguide has an elongated body configured to guide waves between a first end and a second end to at least one sensor feature of the waveguide between the first end and second end so that each sensor feature reflects a wave mode and/or transmits the wave mode;
receive the at least one ultrasonic wave with at least one first receiver transducer that converts the wave mode that traveled along the elongated body into a first electronic signal, wherein each waveguide has a first receiver transducer at the second end thereof that captures the wave mode from the ultrasonic transmitter transducer at the first end of the corresponding waveguide;
receiving at least one reflected wave mode with at least one second receiver transducer that converts the reflected wave mode from the elongated body into a second electronic signal, wherein each waveguide has a second receiver transducer at the first end thereof that captures the reflected wave mode that is reflected from the second end of the corresponding waveguide or reflected from the sensor feature of the corresponding waveguide, wherein optionally the at least one ultrasonic transmitter transducer and the at least one second receiver transducer are the same transducer;
receiving data into a data collection system from the plurality of first receiver transducers and the plurality of second receiver transducers so as to receive data of the first electronic signal and the second electronic signal; and
calculating, with the data collection system, properties of a fluid surrounding the plurality of waveguides.

2. The method of claim 1, wherein each waveguide of the plurality of waveguides is in a form selected from solid rod, wire, plate, sheet, hollow tube, pipe or a shell.

3. The method of claim 1, wherein each waveguide is in a form selected from meandering, circular or a spiral.

4. The method of claim 1, wherein each waveguide has the same ultrasonic transmitter transducer at the respective first end of each waveguide.

5. The method of claim 1, wherein each waveguide has a circular, cylindrical, elliptical, triangular, diamond or a hexagonal cross-section.

6. The method of claim 1, wherein each sensor feature has a form selected from notches, kinks, bends, variable geometry, joints, clamping mechanisms, surface treatments or surface coatings.

7. The method of claim 1, wherein the at least one ultrasonic transmitter transducer and the at least one second receiver transducer are the same transducer at the first end of each waveguide.

8. The method of claim 1, wherein the material of the plurality of waveguides is selected from metals or alloys of metals.

9. The method of claim 1, wherein at least one sensor feature is adapted for partial reflection of the wave mode.

10. The method of claim 1, wherein at least one sensor feature is adapted for full reflection of the wave mode.

11. The method of claim 1, wherein at least one sensor feature is adapted for partial transmission of the wave mode.

12. The method of claim 1, wherein at least one sensor feature is configured to reflect the wave mode into a pulse echo mode.

13. The method of claim 1, wherein at least one sensor feature is configured for partial transmission of the wave mode in a through-transmission mode.

14. The method of claim 1, wherein a spacing arrangement between the plurality of sensor features is uniform.

15. The method of claim 1, wherein a spacing arrangement between the plurality of sensor features is not uniform.

16. The method of claim 1, wherein the wave modes are selected from longitudinal, flexural or torsional modes.

17. The method of claim 1, wherein the wave modes are selected from Longitudinal (L(m,n)), Torsional (T(m,n)), Flexural (F(m,n)), Anti-Symmetric (A(m)), Symmetric (S(m)) or Shear Horizontal (SH(m)).

18. The method of claim 1, wherein the plurality of ultrasonic transmitter transducers are selected from piezo-electric, electromagnetic, magneto-strictive, thermo-elastic, opto-mechanic al or electro-mechanical.

19. The method of claim 1, wherein the plurality of ultrasonic transmitter transducers are piezo-electric.

20. The method of claim 1, wherein the method is performed with at least a portion of at least one waveguide being in an environment having a temperature range of −100° C. to 2000° C.

* * * * *